United States Patent [19]

Friedman et al.

[11] Patent Number: 5,073,143
[45] Date of Patent: Dec. 17, 1991

[54] APPARATUS FOR TRANSMITTING TORQUE BETWEEN THE ENGINE AND THE CHANGE SPEED TRANSMISSION OF A MOTOR VEHICLE

[75] Inventors: Oswald Friedman, Lichtenau; Hans-Dieter Elison, Offenburg; Johann Jäckel, Bühl, all of Fed. Rep. of Germany

[73] Assignee: Luk Lamellen Und Kupplungbau GmbH, Bühl, Fed. Rep. of Germany

[21] Appl. No.: 600,255

[22] Filed: Oct. 22, 1990

Related U.S. Application Data

[63] Continuation of Ser. No. 904,683, Sep. 5, 1986, abandoned.

[30] Foreign Application Priority Data

Sep. 5, 1985 [DE] Fed. Rep. of Germany ....... 3531984

[51] Int. Cl.$^5$ ............................ F16D 3/12; F16D 3/14
[52] U.S. Cl. ........................................ 464/68; 464/64; 192/106.2; 74/574
[58] Field of Search ....................... 464/64, 66, 67, 68; 192/106.2; 74/574

[56] References Cited

U.S. PATENT DOCUMENTS

| 3,938,635 | 2/1976 | Davis et al. | 192/106.2 |
| 3,948,373 | 4/1976 | Wörner | 192/106.2 |
| 4,220,233 | 9/1980 | Ban et al. | 464/68 X |
| 4,611,701 | 9/1986 | Friedmann | 192/110 B |
| 4,681,199 | 7/1987 | Maucher et al. | 192/70.23 |
| 4,727,767 | 3/1988 | Aiki et al. | 464/68 X |

FOREIGN PATENT DOCUMENTS

| 97543 | 7/1980 | Japan | 192/106.2 |
| 163360 | 12/1980 | Japan | 464/64 |

Primary Examiner—Daniel P. Stodola
Assistant Examiner—Tony A. Gayoso
Attorney, Agent, or Firm—Peter K. Kontler

[57] ABSTRACT

An apparatus which transmits torque between two flywheels mounted between the crankshaft of the internal combustion engine and the input shaft of the change-speed transmission in a motor vehicle has a composite damper system having first and second dampers which operate in series and a friction generating device which is operated with a delay following each change of the direction of angular movement of one of the flywheels relative to the other flywheel. The input element of one of the first and second dampers is the output element of the other of the first and second dampers.

71 Claims, 4 Drawing Sheets

APPARATUS FOR TRANSMITTING TORQUE BETWEEN THE ENGINE AND THE CHANGE SPEED TRANSMISSION OF A MOTOR VEHICLE

This application is a continuation of application Ser. No. 904,683, filed Sept. 5, 1986, now abandoned.

CROSS-REFERENCE TO RELATED CASES

Certain features of the apparatus of the present invention are disclosed in the commonly owned copending patent applications Ser. Nos. 848,730, now U.S. Pat. No. 4,681,199 granted July 21, 1987, 848,732, now abandoned, and 844,475, now U.S. Pat. No. 4,782,933 granted Sept. 6, 1988.

BACKGROUND OF THE INVENTION

The invention relates to apparatus for transmitting torque between the engine and the change-speed transmission of a motor vehicle. More particularly, the invention relates to improvements in apparatus wherein one flywheel of a composite flywheel is connected to the crankshaft of the engine and another flywheel of the composite flywheel is connected to the input shaft of the change-speed transmission, and wherein several dampers operate between the first and second flywheels to compensate for irregularities of torque transmission between the flywheels.

DE-OS 28 26 274 discloses an apparatus wherein the damper means between the flywheels generates a constant frictional moment during each and every stage of angular movement of one flywheel relative to the other flywheel. Such mode of operation is not satisfactory under any and all operating conditions. Otherwise stated, the damper means of such apparatus is not sufficiently versatile to operate satisfactorily under all or nearly all circumstances under which the power train between the engine and the wheels of a motor vehicle is expected to be put to use.

OBJECTS AND SUMMARY OF THE INVENTION

An object of the invention is to provide an apparatus which is more versatile than heretofore known apparatus for transmission of torque between coaxial flywheels which are rotatable relative to each other, particularly in the power train between the engine and the change-speed transmission of a motor vehicle.

Another object of the invention is to provide an apparatus which can operate properly during idling of the engine as well as when the transmission is called upon to transmit motion from the output means of the engine to the wheels of the motor vehicle.

A further object of the invention is to provide an apparatus which can damp fluctuations of torque transmission by an internal combustion engine in a satisfactory way regardless of the momentary stage or mode of operation of the engine.

Still another object of the invention is to provide an apparatus which ensures that the hysteresis during idling of the engine is negligible or zero so that the apparatus then effects a minimum of damping, as well as that the damping action and hysteresis remain small or negligible when the angular displacement of one of the flywheels relative to the other flywheel or flywheels is relatively small.

Still another object of the invention is to provide a simple, compact and relatively inexpensive apparatus for transmission of torque between the crankshaft of the engine and the input shaft of the change-speed transmission in a passenger car, a truck or another motor vehicle.

The improved apparatus is used to damp torsional vibrations in the power train between the internal combustion engine and the transmission of a motor vehicle It comprises a composite flywheel including a first flywheel which is connected to the output element (such as a crankshaft) of the engine and a second flywheel which serves to transmit torque to the change-speed transmission, particularly through the medium of a friction clutch. The first and second flywheels are coaxial with and are rotatable relative to each other clockwise and counterclockwise. The apparatus further comprises torque-transmitting damper means which is operative to oppose angular movements of the first and second flywheels relative to each other from a neutral position. The damper means includes a first damper having means for opposing at least one stage of angular movements of the first and second flywheels relative to each other with an increasing force, a second damper which operates in series or in parallel with the first damper and has means for opposing at least one range of angular movements of the first and second flywheels relative to each other with an increasing force when the magnitude of torque which one of the first and second flywheels transmits to the other of the first and second flywheels reaches a preselected value, and a third damper including a friction generating device which opposes angular movements of the first and second flywheels relative to each other with the exception of a predetermined angle following each change of the direction of angular movements of the first and second flywheels relative to each other.

The maximum torque which the first damper can transmit is preferably between 80 and 130% of the nominal torque of the engine.

The characteristic curve of the first damper preferably corresponds to between 10 and 35 Nm/degree (Newton meters per degree) during clockwise and counterclockwise angular movements of the first and second flywheels relative to each other.

The hysteresis of the first damper is preferably less than 30 Nm.

In accordance with a presently preferred embodiment, the hysteresis of the first damper is between 2 and 30 Nm, particularly between 3 and 25 Nm, during clockwise and also during counterclockwise angular movements of the first and second flywheels relative to each other.

The aforementioned stage of operation of the first damper preferably includes an angular movement between 14° and 20° (particularly between 16° and 18°) in one direction, and an angular movement between 10° and 20° (particularly between 12° and 16°) in the opposite direction from the neutral position.

The damper means can further comprise a further damper (such as a coil spring or a set of coil springs) for opposing the angular movements of the first and second flywheels relative to each other from the neutral position within a second stage of angular movements which overlaps the stage of operativeness of the first damper. The characteristic curve of the first damper is steeper than that of the further damper. The means for opposing angular movements during the second stage includes at least one resilient element with a spring characteristic of 1-5 Nm/degree in clockwise and counterclockwise directions. The hysteresis of the means for opposing the angular movements during the second stage is preferably between 2 and 30 Nm in clockwise and counterclockwise directions.

The maximum torque which the second damper can transmit is preferably between 100 and 250% of nominal torque of the engine.

The characteristic curve of the second damper is preferably between 30 and 150 Nm, preferably between 50 and 120 Nm, during clockwise and counterclockwise angular movements of the first and second flywheels relative to each other, and the aforementioned range preferably follows the stage of operation of the first damper in clockwise and counterclockwise directions.

The hysteresis of the second damper is preferably between 100 and 500 Nm, most preferably between 130 and 350 Nm, during clockwise and counterclockwise angular movements of the first and second flywheels relative to each other.

The aforementioned range is preferably between 2° and 10°, most preferably between 3° and 8°, during angular movements of the first and second flywheels relative to each other in a clockwise or in a counterclockwise direction.

The friction generating device of the third damper preferably exhibits a pronounced stop of between 10 and 200 Nm, preferably between 10 and 120 Nm, following each reversal of clockwise and counterclockwise angular movements of the first and second flywheels relative to each other.

The aforementioned predetermined angle is preferably between 2 and 10 degrees, most preferably between 2 and 8 degrees.

The friction generating device of the third damper can comprise means for opposing different portions of angular movements of the first and second flywheels relative to each other with different forces. For example, if the friction generating device is arranged to generate a predetermined overall friction torque, it can include a first unit having means for generating between $\frac{1}{3}$ and $\frac{2}{3}$ of the overall torque while the first and second flywheels perform first angular movements relative to each other in one direction and between $\frac{1}{3}$ and $\frac{2}{3}$ of the overall torque while the first and second flywheels perform such first angular movements relative to each other in the opposite direction. The friction generating device preferably further comprises a second unit having means for generating between $\frac{2}{3}$ and $\frac{1}{3}$ of the overall torque while the first and second flywheels perform second angular movements relative to each other in the one direction and between $\frac{2}{3}$ and $\frac{1}{3}$ of the overall torque while the first and second flywheels perform the second angular movements relative to each other in the other direction. The first unit can be operative during the initial portions of angular movements following a reversal in the direction of such angular movements, and the second unit is then operative during the next-following portions of angular movements following a reversal in the direction of the angular movements. The first portion of angular movements can be between 1° and 5°, and only the first unit is preferably operative during the first portion of each angular movement. The first and second units are preferably operative jointly to oppose the angular movements of the flywheels relative to each other following each reversal in the direction of angular movements and after the first and second flywheels complete an angular movement through the aforementioned predetermined angle and thereafter through one of the initial portions of angular movement.

The damper means can further comprise a fourth damper having a friction generating device with means for opposing all or practically all angular movements of the first and second flywheels relative to each other. The fourth damper can have a hysteresis between 8 and 30 Nm, preferably between 10 and 25 Nm.

Each of the first and second dampers can comprise a pair of discs and the first damper further comprises means for securing the respective discs to one of the flywheels while the second damper comprises means for securing the respective discs to the other of the flywheels. The first and second dampers further comprise a common flange having a first portion between the discs of the first damper and a second portion between the discs of the second damper. The discs of one of the two pairs of discs can be disposed radially outwardly of the discs of the other pair. The flange can overlap the discs of the first and second pairs, as considered in the radial direction of the flywheels. In accordance with a presently preferred embodiment of the invention, the discs of the second damper rotate with the first flywheel and constitute the input element of the second damper. The respective portion of the flange constitutes the output element of the second damper and the other portion of the flange constitutes the input element of the first damper. The discs of the first damper then constitute the output element of such damper The discs of the first damper in such apparatus are preferably connected with the second flywheel.

The apparatus preferably further comprises means for biasing the discs of the second damper against the respective portion of the flange. The second damper of such apparatus can further comprise a friction lining between the second portion of the flange and at least one disc of the second damper.

One disc of the second damper is preferably movable axially of the flywheels toward and away from the other disc of the second damper. The means for securing the discs of the second damper to the respective flywheel can comprise at least one rivet, and the second damper preferably further comprises means for biasing the one disc axially of the flywheels toward the other disc of the second damper. The biasing means can comprise at least one spring (particularly a diaphragm spring) which reacts against the other flywheel and bears against the one disc of the second damper. The rivet is preferably designed to hold the one disc of the second damper against rotation relative to the other flywheel, and the second portion of the flange is preferably provided with an opening which receives the rivet with limited freedom of angular movement of the flange relative to the other flywheel.

At least one of the flywheels can be provided with an axial extension (such as a cylindrical sleeve) which is disposed radially outwardly of the damper means and preferably directly surrounds the second damper. As mentioned above, the second damper can comprise an input element having two coaxial discs, an output element (such as the corresponding portion of the aforementioned flange) between the discs, means for securing the discs to the first flywheel so that one of the discs is movable axially toward and away from the other of the discs, and means for biasing the one disc toward the other disc so that the output element is in frictional engagement with the discs. The biasing means can comprise a diaphragm spring which reacts against the first flywheel and bears against the one disc.

The friction generating device of the third damper can comprise at least one friction generating element (such as a friction disc or a diaphragm spring) which serves to rotate with the first flywheel, and means for limiting the extent of angular movability of the friction generating element relative to the second flywheel. Such friction generating device can be disposed between the first and second flywheels and can be mounted on the first flywheel. One flywheel can be provided with an axial protuberance and the friction generating device of the third damper can be mounted to surround such protuberance of the one flywheel. The apparatus can further comprise bearing means (such as an antifriction bearing) which is interposed between the first and second flywheels. At least a portion of the friction generating device of the third damper can be mounted between a radial flange of one of the flywheels and the bearing means. Such friction generating device can comprise at least one friction disc and means for biasing the friction disc axially of the flywheels toward the radially extending flange of the one flywheel. The biasing means can comprise a diaphragm spring which reacts against at least one race of the bearing means and bears against the friction disc. The one flywheel can comprise a ring, and the diaphragm spring is preferably mounted to react against the ring.

In accordance with a presently preferred embodiment of the invention, the friction generating device of the third damper comprises a frictin disc which serves to rotate with one of the flywheels and has at least one projection extending in the direction of the common axis of the first and second flywheels. The other flywheel of such apparatus has a portion which is provided with a recess (such as a circumferentially extending slot) which receives the projection with a predetermined freedom of angular movement of the friction disc and the other flywheel relative to each other. The friction generating device of the third damper can comprise two concentric friction discs and means (such as the aforementioned diaphragm spring) for biasing one of the discs toward the other disc. Such friction generating device can further comprise means for holding the friction discs to limited angular movements relative to each other. The holding means can comprise at least one first projection which is provided on one of the friction discs and two second projections which are provided on the other friction disc and flank the first projection with a predetermined freedom of movement of the first projection between the second projections. The first projection can extend substantially radially of the flywheels and the second projections then extend substantially axially of the flywheels (or vice versa). The other friction disc is or can be in frictional engagement with one of the first and second flywheels, and such other friction disc can further comprise a lug which cooperates with the other of the first and second flywheels to permit limited angular movements of the other friction disc and the other flywheel relative to each other. The lug can be disposed between the second projections as seen in the circumferential direction of the flywheels.

A friction ring can be disposed between the friction discs of the friction generating device of the third damper. The other friction disc can be placed adjacent the aforementioned radially extending portion or flange of the one flywheel, and the friction generating device of the third damper can further comprise a friction ring which is interposed between the flange of the one flywheel and the other friction disc.

The friction generating device can comprise means for limiting the friction discs to a first angular displacement relative to each other, and means for limiting the one friction disc and the other of the first and second flywheels to a different second angular displacement relative to each other. The second angular displacement is or can be smaller than the first angular displacement.

The diaphragm spring of the friction generating device of the third damper is or can be maintained in axially stressed condition. The radially outermost portion of such diaphragm spring can bear directly against one of the friction discs and the radially innermost portion of such diaphragm spring can be anchored in the first flywheel. To this end, the ring on the axial protuberance of the first flywheel can be provided with an opening for a portion of the diaphragm spring. Such portion of the diaphragm spring cooperates with the ring to hold the diaphragm spring against rotation relative to the ring. As mentioned above, the ring can have at least one opening, and the inner portion of the diaphragm spring can comprise an arm, projection, lug or a like part which extends into the opening.

The damper means of the improved apparatus can comprise a fourth damper including a friction generating device which serves to oppose all or nearly all angular movements of the first and second flywheels relative to each other and is disposed outwardly of the third damper, as seen in the radial direction of the first and second flywheels. Such fourth damper can surround the friction generating device of the third damper. The first and fourth dampers of such apparatus can be disposed at or close to the same distance from the common axis of the first and second flywheels. The friction generating device of the fourth damper can be disposed between the first damper and the aforementioned radially extending portion or flange of the first flywheel. More specifically, the friction generating device of the fourth damper can be disposed between one of the discs which constitute the input element of the first damper and the flange of the first flywheel. The fourth damper can comprise a friction disc and a friction ring which is disposed between the friction disc and the flange of the first flywheel.

The fourth damper can further comprise a diaphragm spring which reacts against the one disc of the input element of the first damper and bears against the friction disc of the fourth damper. Such diaphragm spring can comprise at least one projection which is anchored in the one disc of the output element of the first damper. The friction disc of the fourth damper can be provided with at least one projection which is anchored in the one disc of the output element of the first damper. The diaphragm spring of such fourth damper can comprise two projections which flank the projection of the friction disc, as seen in the circumferential direction of the flywheels.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
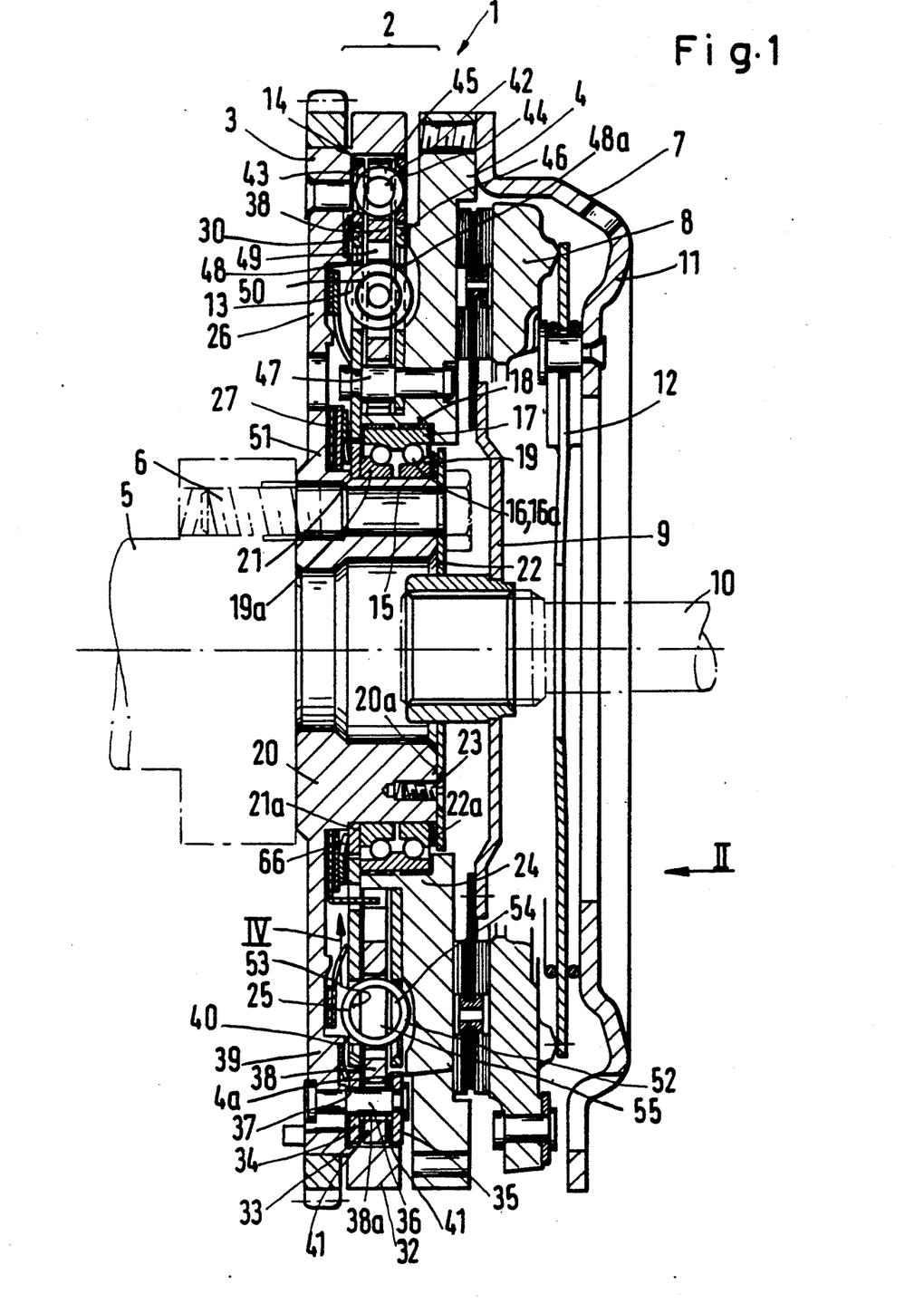
FIG. 1 is an axial sectional view of an apparatus which embodies one form of the invention.
Figure 2:
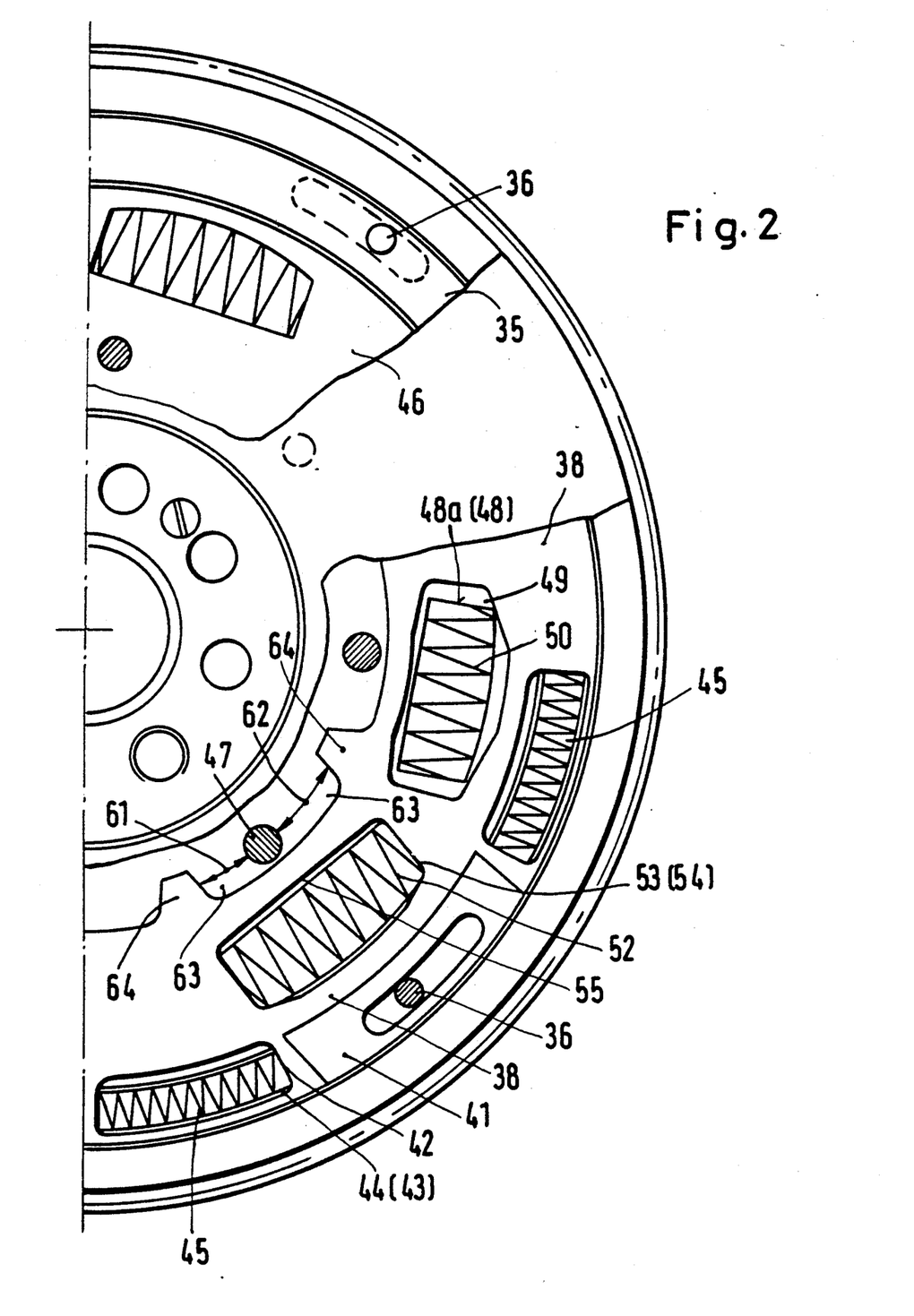
FIG. 2 is a fragmentary end elevational view as seen in the direction of arrow II in FIG. 1.

The apparatus 1 which is shown in FIGS. 1 and 2 serves to oppose angular movements of two coaxial flywheels 3 and 4 relative to each other. Such flywheels constitute two components of a composite flywheel 2 which can comprise more than two discrete flywheels. The flywheel 3 is secured to the crankshaft 5 of an internal combustion engine by a set of bolts 6 or similar fasteners, and the flywheel 4 can transmit torque to the input shaft 10 of a change-speed transmission in response to engagement of a friction clutch 7. The friction clutch 7 comprises a cover 11 which is non-rotatably secured to the flywheel 4 by a set of bolts, a pressure plate 8 which is movable axially between the flywheel 4 and the inner side of the cover 11 and rotates with the flywheel 4, a clutch plate 9 which is secured to the input shaft 10 and has friction linings between the flywheel 4 and the pressure plate 8, and a diaphragm spring 12 which is tiltably mounted between two annular seats at the inner side of the cover 11 and normally bears against the pressure plate 8 so that the clutch plate 9 is clamped between the pressure plate and the flywheel 4.

The damper means for opposing and damping angular movements of the flywheels 3 and 4 relative to each other comprises a first damper 13, a second damper 14 which is mounted in series with the damper 13, and at least one additional damper, such as a friction generating device 27. The dampers 13 and 14 permit limited angular movements of the flywheels 3 and 4 relative to each other.

The apparatus 1 further comprises bearing means 15 interposed between the flywheels 3 and 4 and comprising an antifriction bearing 16 having an outer race 17, two inner races 19, 19a, and two rows of spherical antifriction rolling elements 16a, one row between the races 17, 19 and the other row between the races 17, 19a. Similar bearing means are disclosed in several pending patent applications of the assignee of the present application. The outer race 17 is received in an axial recess 18 of the flywheel 4, and the inner races 19, 19a are mounted on an axial protuberance 20 of the flywheel 3. The protuberance 20 extends into the recess 18.

The inner race 19a is or can be a press fit on the protuberance 20 and abuts a ring 21a which, in turn, abuts a circumferential shoulder 21 of the protuberance 20. The inner race 19 is held against axial movement away from the inner race 19a by a disc-shaped retainer 22 which is maintained in abutment with the end face 20a of the protuberance 20 by a set of screws 23 or other suitable fasteners. A diaphragm spring 22a reacts against the adjacent side of the retainer 22 and bears against the inner race 19 so as to prevent any stray movements of the rolling elements 16a. The race 19 is movable axially along the periphery of the protuberance 20.

The apparatus 1 further comprises a thermal insulator 24 which is interposed between the bearing means 15 and the flywheel 4 so as to prevent the transfer of excessive quantities of heat from the region where the friction surface 4a of the flywheel 4 engages the adjacent friction lining of the clutch plate 9. Similar thermal insulators are disclosed in numerous pending patent applications of the assignee. The main purpose of the thermal insulator 24 is to prevent an overheating of lubricant (such as a grease) in the space between the inner races 19, 19a and the outer race 17 of the antifriction bearing 16. Furthermore, the thermal insulator 24 reduces the likelihood of excessive thermally induced distortion of the bearing means 15 which could result in jamming of the rolling elements 16a between the outer race 17 and the inner races 19, 19a.

The apparatus 1 also comprises fourth and fifth dampers 25 and 26 in addition to the aforementioned friction generating device or damper 27 and dampers 13, 14.

The radially outermost portion of the flywheel 3 has an axial extension (outer wall) 32 in the form of a sleeve which surrounds a chamber 33 for the dampers 13, 14, 25, 26 and 27.

The input element of the damper 14, which is nearest to the extension or outer wall 32 of the first flywheel 3, comprises two discs 34, 35 which are spaced apart from each other in the direction of the common axis of the flywheels 3, 4 and rotate with the first flywheel 3. The disc 35 is secured to the flywheel 3 by a set of rivets 36. The disc 34 is mounted on the rivets 36 in such a way that it is compelled to rotate with the flywheel 3 and with the disc 35 but is movable axially toward and away from the disc 35. To this end, the disc 34 has openings 37 (for example, circular holes or bores) which surround the adjacent portions of the corresponding rivets 36 with negligible play barely sufficient to permit the disc 34 to move axially toward and away from the disc 35.

The output element of the damper 14 comprises a flange 38 which is clamped between the discs 34 and 35 by an energy storing element in the form of a diaphragm spring 40 serving to bias the disc 34 toward the disc 35 and to thereby maintain the discs 34, 35 in frictional engagement with the adjacent portions of the flange 38.

It is preferred to provide the damper 14 with friction linings 41 which are interposed between the discs 34, 35 and the respective sides of the flange 38. For example, the linings 41 can be bonded to the discs 34, 35 and are then in frictional sliding engagement with the flange 38, or they can be bonded to the flange 38 to be in frictional sliding engagement with the discs 34 and 35. The discs 34, 35 and the flange 38 are respectively provided with registering windows 43, 44, 42 which receive energy storing elements in the form of coil springs 45 serving to yieldably oppose angular movements of the flange 38 relative to the discs 34, 35 and/or vice versa.

The flange 38 not only constitutes the output element of the damper 14 but also the input element the damper 13. The output element of the damper 13 comprises two discs 30, 46 which flank the flange 38 radially inwardly of the discs 34, 35 and are nonrotatably secured to the flywheel 4 by distancing elements in the form of rivets 47.

The discs 30, 46 and flange 38 are respectively provided with windows 48, 48a and 49 for energy storing elements in the form of coil springs 50 which yieldably oppose angular movements of the flange 38 relative to the discs 30, 46 and/or vice versa.

The friction generating device or damper 27 between the flywheels 3 and 4 is operative only within a certain range of angular movements of the flywheels relative to each other. This friction generating device is adjacent the radially innermost portion 51 of the radial flange 39 of the first flywheel 3 and is disposed between the portion 51 on the one hand and the races 17, 19a of the antifriction bearing 16 on the other hand. The exact construction and mode of operation of the friction generating device 27 will be described with reference to FIGS. 3, 4 and 5.

The damper or friction generating device 25 comprises energy storing elements in the form of coil springs 52 which are installed in registering windows 53, 54 (of the discs 30, 46) and 55 (of the flange 38). As can be seen in FIG. 2, the length of the windows 53, 54 (as measured in the circumferential direction of the flywheels 3 and 4) is the same as the length of the windows 55 in the flange 38. On the other hand, the windows 48, 48a in the discs 30, 46 are shorter than the adjacent windows 49 of the flange 38 for the coil springs 50 forming part of the damper 13. The characteristic curves of the coil springs 52 are flatter than those of the coil springs 50. Furthermore, the characteristic curves of coil springs 45 forming part of the damper 14 are steeper than those of the coil springs 50, and the coil springs 45 are installed in prestressed condition in the corresponding windows 42, 43, 44 of the flange 38 and of the discs 34, 35. The length of the windows 42 (as measured in the circumferential direction of the flywheels 3 and 4) matches or closely approximates the length of the windows 43, 44.

FIG. 2 further shows that the internal surface of the flange 38 is provided with radially outwardly extending cutouts or recesses 63 for the corresponding portions of the respective rivets 47. The recesses 63 alternate with projections or teeth 64 of the flange 38. Each rivet 47 is flanked by two teeth 64. The rivets 47 cooperate with the adjacent teeth 64 to determine the range of the damper 13, i.e., to determine that angle through which the flywheels 3, 4 can turn relative to each other while the damper 13 is effective to oppose and damp such movements.

The extent to which the flywheels 3 and 4 can turn relative to each other is determined by the combined clearance 61+62 between a rivet 47 and the adjacent pair of teeth 64 of the flange 38. Furthermore, the extent of angular movability of the flywheels 3 and 4 relative to each other is determined by the extent to which the energy storing coil springs 45 of the damper 14 can be compressed in the circumferential direction of the flywheels. Maximum compression of the coil springs 45 is achieved when their neighboring convolutions actually abut each other or is determined by the extent to which the rivets 36 are movable in the circumferential direction of the flywheels 3 and 4 relative to the arcuate openings or slots 38a which are provided therefor in the flange 38.

Figure 3:
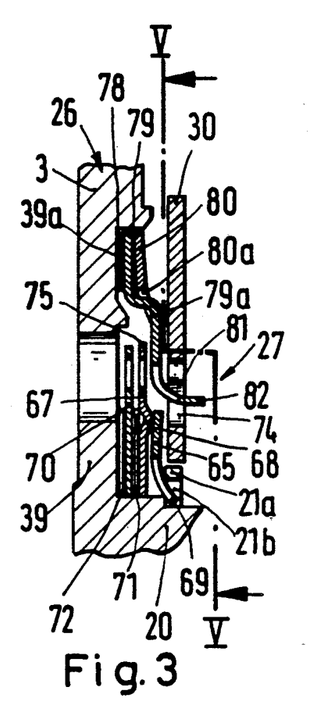
FIG. 3 is an enlarged sectional view of a detail and the apparatus of FIG. 1.
Figure 4:
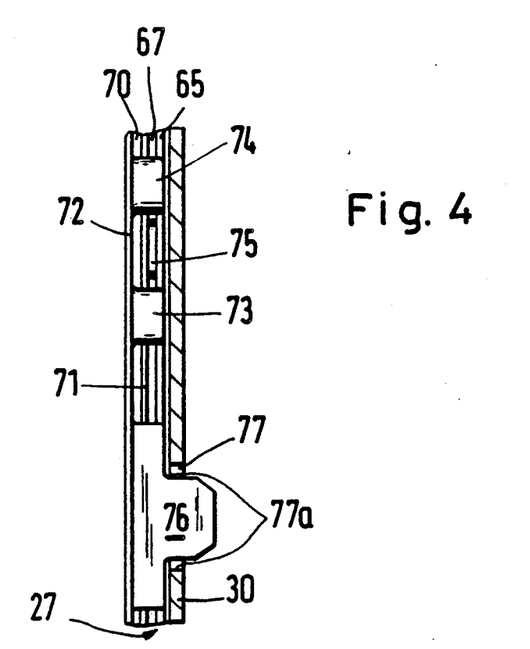
FIG. 4 is a view as seen in the direction of arrow IV in FIG. 1.
Figure 5:
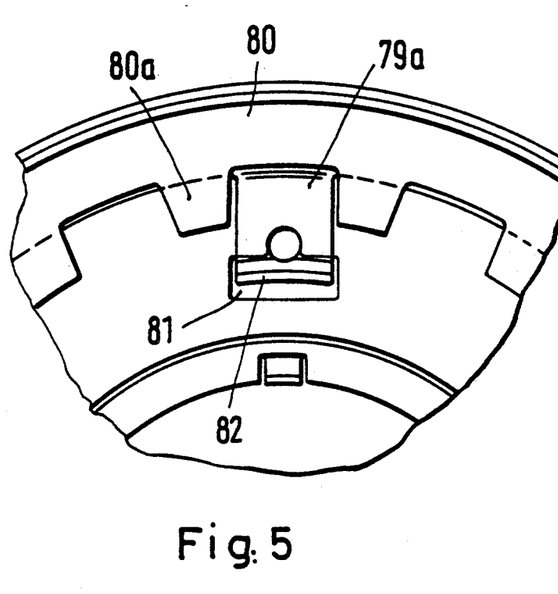
FIG. 5 is a sectional view as seen in the direction of arrows from the line V—V of FIG. 3.

The details of the friction generating device 27 are shown in FIGS. 3, 4 and 5. This friction generating device comprises a disc-shaped diaphragm spring 65 which has projections in the form of prongs 66 (see FIG. 1) abutting the adjacent side of the ring 21a which bears against the external shoulder 21 of the flywheel 3. The prongs 66 extend radially inwardly, and the diaphragm spring 65 further comprises radially outwardly extending projections or arms 69 which extend axially into openings 21b of the ring 21a so that the diaphragm spring 65 and the ring 21a must rotate as a unit. The diaphragm spring 65 reacts against the ring 21a and bears against a friction disc 67. In the illustrated embodiment, the diaphragm spring 65 engages directly an annular rib or seat 68 of the friction disc 67.

The friction generating device 27 further comprises a second friction disc 67 and the radial flange 39 of the first flywheel 3. The diaphragm spring 65 biases the friction disc 67 toward the friction disc 70 which latter is flanked by two friction rings 71 and 72. The friction ring 71 is disposed between the friction discs 67, 70 and the friction ring 72 is disposed between the friction disc 70 and the flange 39 of the flywheel 3.

The friction disc 70 has projections or arms 73, 74 which are disposed radially outwardly of the friction rings 71 and 72 and extend in parallelism with the common axis of the flywheels 3, 4 over the friction disc 67. The friction disc 67 has radially outwardly extending projections or lugs 75 each of which is received with a certain play between two neighboring arms 73, 74 of the friction disc 70. In other words, the friction discs 67 and 70 have a certain freedom of angular movement relative to each other.

The friction disc 70 has additional projections or arms in the form of lugs 76 which extend in parallelism with the common axis of the flywheels 3, 4 and with a certain play 77a into the openings 77 of the disc 30. As mentioned above, the disc 30 is held against rotation relative to the flywheel 4. The difference between the widths of the lugs 76 and openings 77 in the circumferential direction of the flywheels 3, 4 determines the angle of ineffectiveness of the friction generating device 27 in response to each reversal of the direction of rotation of the flywheel 3 relative to the flywheel 4 or vice versa. Thus, when the direction of rotation of the flywheel 3 relative to the flywheel 4 (or vice versa) is changed, the lugs 76 can move relative to the disc 30 (or vice versa) to the extent which is determined by the play 77a so that the friction generating device 27 is ineffective through the selected angle whenever the direction of relative angular movement of the flywheels 3 and 4 is changed.

The friction generating device 27 is preferably designed in such a way that the moment of friction between the friction ring 71 and the friction disc 70 is smaller than that between the diaphragm spring 65 and the friction disc 67. This ensures that pronounced friction between the friction disc 70 and the diaphragm spring 65 develops only when the arm 73 or 74 strikes against the adjacent projection 75. Such striking takes place when the friction disc 70 changes the direction of angular movement relative to the friction disc 67 and after the projections 75 move from engagement with the arms 73 into engagement with the arms 74 or vice versa. Pronounced friction between the friction disc 70 and the diaphragm spring 65 prevails as long as the diaphragm spring 65 turns relative to the friction discs 67 and 70. When the friction discs 67 and 70 turn relative to each other, i.e., when the direction of angular movement of the flywheel 3 relative to the flywheel 4 (or vice versa) is changed, for example, when the friction disc 67 starts to turn relative to the friction disc 70, the flywheels 3 and 4 must overcome the less pronounced friction between the friction ring 71 and one of the friction discs 70, 67 while the projections 75 move from engagement with the arms 73 into engagement with the arms 74 or vice versa.

When the flywheels 3 and 4 turn relative to each other, the friction disc 70 produces a frictional damping action only when the lugs 76 move into engagement with the surfaces at the one or the other end of the respective openings 77 in the disc 30 which latter is non-rotatably connected with the flywheel 4. As soon as the lugs 76 begin to turn the friction disc 70, the friction rings 71 and 72 generate a relative frictional damping action until the arms 73, 74 reach the respective projections 75 of the friction disc 67. The friction disc 67 begins to turn relative to the flywheel 3 as soon as one of the arms 73, 74 reaches the respective projection 75 so that friction which has been generated theretofore by the friction ring 71 is terminated and the angular movements of flywheels 3, 4 relative to each other are then opposed by pronounced friction between the rib or seat 68 of the friction disc 67 and the diaphragm spring 65.

The just described construction of the friction generating device 27 renders it possible to increase the frictional damping action in stepwise fashion as the extent of angular displacement of the flywheel 3 relative to the flywheel 4 (or vice versa) increases.

FIGS. 3 and 5 show that the friction generating device 26 is disposed between the disc 30 the damper 13 and the radial flange 39 of the flywheel 3. This friction generating device 26 comprises a friction ring 78 which is disposed between a friction surface 39a of the flange 39 and a friction disc 79. The friction disc 79 is acted upon by the radially outermost portion of a diaphragm spring 80 which is installed between the friction disc 79 and the disc 30 in prestressed condition. The diaphragm spring 80 has radially inwardly extending projections or prongs 80a which engage the disc 30 and are bent in the direction of the common axis of the flywheels 3 and 4. In order to ensure that it cannot rotate relative to the disc 30, the friction disc 79 has radially inwardly extending projections or lugs 79a which extend into complementary sockets or recesses 81 of the disc 30 in the axial direction of the flywheels. To this end, the tips 82 of the projections 79a are bent in a manner as shown in FIG. 3.

FIG. 5 shows that each projection 79a of the friction disc 79 is disposed between two prongs 80a of the diaphragm spring 80. This is of advantage in connection with assembly of the apparatus 1 because it allows for proper positioning of the diaphragm spring 80 relative to the friction disc 79. At the same time, the friction disc 79, and more particularly its projections 79a can be properly positioned relative to the disc 30.

FIGS. 1 and 3 show that the friction generating device 26 is disposed radially outwardly of the friction generating device 27. The friction generating devices 26 and 27 are preferably disposed in a common plane which makes a right angle with the common axis of the flywheels 3 and 4. This contributes to compactness of the composite friction generating device 26, 27.

The mode of operation of the apparatus 1 which is shown in FIGS. 1-5 will be described with reference to the torsion diagram of FIG. 6. The angular movements of the flywheels 3 and 4 relative to each other are measured along the abscissa and the torque which is transmitted between the flywheels 3 and 4 is measured along the ordinate. The arrow 83 denotes the direction in which the flywheel 3 can drive the flywheel 4 when the engine is on, i.e., when the flywheel 3 is rotated by the crankshaft 5 through the medium of the bolts 6. The arrow 84 denotes the direction in which the flywheels 3 and 4 can rotate when the vehicle is coasting. It will be understood that the friction clutch 7 must be engaged if the flywheel 3 is to rotate the input shaft 10 of the change-speed transmission through the medium of the flywheel 4.

The reference character 85 denotes the characteristic curve of the damper 13 and of the friction generating device 25 which operates in parallel with the damper 13. The curve 85 further denotes hysteresis which is generated by the friction generating device 26. The reference character 86 denotes the characteristic curve of the damper 14 and the hysteresis which is generated as a result of friction between the linings 41 and the discs 34, 35. Hysteresis which is generated by the friction generating device 27 is shown at 87. Such hysteresis develops when the angular displacement of the flywheels 3 and 4 relative to each other has reached the maximum value. FIG. 6 shows that the resistance which the damper 14 offers to angular movements of the flywheels 3, 4 relative to each other exceeds the resistance which is offered by the damper 13.

Starting from the initial or neutral positions of the dampers 13, 14 and 25 (see FIG. 2), from the median or central positions of the projections 76 in the respective openings 77 (as shown in FIG. 4), and from the neutral or central positions of the projections 75 relative to the adjacent projections 73 and 74 (FIG. 4), the coil springs 52 are first to undergo compression and store energy when the flywheel 3 turns relative to the flywheel 4 in the direction of the arrow 83. The friction generating device 26 of the fourth damper of damper means between the flywheels 3, 4 is designed to oppose all angular movements of the flywheels 3 and 4 relative to each other. When the flywheel 3 completes the angle A, the projections 76 engage the surfaces at one end of the respective openings 77 so that the friction disc 70 is rotated relative to the flywheel 3 and the flywheel 3 encounters an additional resistance to angular movement relative to the flywheel 4. Such additional resistance is offered by the friction disc 70 and is indicated at 88. As the flywheel 3 continues to turn relative to the flywheel 4 in the direction of the arrow 83, the coil springs 52 also undergo compression and store energy until the coil springs 50 engage the surfaces at the respective ends of the windows 49 in the flange 38. This takes place when the flywheel 3 completes the angle B.

When the angle B is exceeded, the coil springs 50 and 52 undergo compression at the same time because they are mounted to operate in parallel. When the flywheel 3 completes the angle C, the projections 73 and 74 of the friction disc 70 engage the adjacent projections 75 of the friction disc 67 so that, if the flywheel 3 continues to turn in the direction of the arrow 83 (relative to the flywheel 4), the friction disc 67 is caused to turn relative to the flywheel 3. This increases the resistance which the flywheel 3 encounters to rotation relative to the flywheel 4 because the friction disc 67 generates additional friction (indicated at 89 in FIG. 6). The additional friction 89 corresponds to the difference between the moment of friction which is generated as a result of friction between the diaphragm spring 65 and the friction disc 67 and the moment of friction which is generated by the friction ring 71 between the friction discs 67 and 70. The generation of a moment of friction by the friction ring 71 is terminated when the angle C is exceeded because, at such time, the friction discs 67 and 70 rotate (in synchronism) as a unit. If the flywheel 3 continues to turn in the direction of the arrow 83 with reference to the flywheel 4, the coil springs 50 and 52 (which operate in parallel) are subjected to additional compression until the moment which is generated by such coil springs upon the flange 38 exceeds the moment of friction which is generated by the friction linings 41 plus the opposition of the coil springs 45. This takes place when the angular displacement of the flywheel 3 relative to the flywheel 4 reaches the value D.

If the flywheel 3 continues to rotate in the direction of the arrow 83 beyond the angle D, the coil springs 45 of the damper 14 also undergo compression and the friction linings 41 generate a moment of friction. Compression of the coil springs 45 (which are connected in series with the coil springs 50, 52) takes place until the angular displacement of the flywheel 3 reaches the angle E and the rivets 47 strike against the adjacent teeth 64 of the flange 38. At such time, the damper 13 is bridged or bypassed which means that the coil springs 50 and 52 do not undergo any additional compression. When the angle E is exceeded, only the coil springs 45 of the damper 14 undergo additional compression until the flywheel 3 reaches the end of its angular movement in the direction of the arrow 83. While the flywheel 3 rotates through the angle F, the coil springs 45 cooperate with the friction generating device 26, with the friction generating device 27 as well as with the friction linings 41.

When the flywheel 3 rotates in the opposite direction (arrow 84) back toward the neutral position, the coil springs 45 dissipate energy during angular movement of the flywheel 3 through the angle G because the compression moment of the coil springs 45 suffices to ensure that the coil springs 50 and 52 remain in compressed condition. This means that the teeth 64 continue to abut the rivets 47. As the flywheel 3 continues to turn in the direction of the arrow 84, the coil springs 45 dissipate energy jointly with the coil springs 50 and 52.

When the flywheel 3 completes an angle H in the direction of the arrow 84, the projections 76 of the friction disc 70 (which have moved away from the respective surfaces in the associated openings 77 as a result of the reversal of angular movement of the flywheel 3 relative to the flywheel 4) come into abutment with the surfaces at the opposite ends of the respective openings 77 so that the friction disc 70 (which for a while has not changed its angular position relative to the flywheel 3) begins to turn so as to bring about a change in the resistance in accordance with the moment 88 of friction which is generated by the friction disc 70. The angle H corresponds to the amount of play (77a) between the projections 76 and the surfaces bounding the ends of the respective openings 77.

When the flywheel 3 completes an angular movement through the angle H and thereupon through the angle J, the projections 74 or 73 of the friction disc 70 engage the projections 75 of the friction disc 67 so that, as the flywheel 3 continues to turn in the direction of arrow 84, the friction disc 67 is rotated relative to the flywheel 3 which entails a change of the moment of resistance due to the additional moment 89 of friction which is generated by the friction disc 67. The angle J corresponds to the overall or total play between the projections 75 and the neighboring projections 73, 74. When the flywheel 3 completes an angle K (in the direction of arrow 84), the coil springs 50 of the damper 13 become ineffective so that, as the flywheel 3 continues to turn beyond the angle K, only the elements 52 of the damper 25 of the damper means generate a restoring force which tends to move the flywheel 3 back to its starting or neutral position. The dampers 13, 14, 25 as well as the friction generating devices 26, 27 and friction linings 41 operate in the same or a similar way regardless of whether the flywheel 3 turns relative to the flywheel 4 in the direction of the arrow 83 or 84 or whether the flywheel 4 turns relative to the flywheel 4 in the direction of the arrow 84 or 83. However, it is not absolutely necessary that the angles during which certain dampers operate while the flywheel 3 (or 4) turns in the direction of the arrow 83 correspond exactly to the angles during which such dampers are operative while the flywheel 3 (or 4) turns in the direction of the arrow 84. It has been found that the apparatus 1 is particularly effective if the various moments of friction and other parameters are selected in the following way (whereby one or more parameters may but need not match those which are outlined below):

The maximum torque 90 of the first damper 13 amounts to 80 to 130% of nominal torque of the engine.

The torque which is transmitted by the first damper 13 increases at a rate of 10 to 35 Nm/degree (Nm=Newton meters) in the direction of the arrow 83 and at a rate of 10 to 35 Nm/degree in the direction of the arrow 84.

The damper 13 has a hysteresis 91 of less than 30 Nm. Preferably, the damper 13 has a hysteresis of 2 to 30 Nm (most preferably 3 to 25 Nm) in the direction of the arrow 83, and a hysteresis of between 2 and 30 Nm (most preferably between 3 and 25 Nm) in the direction of the arrow 84.

The damper 13 is effective at both sides of its neutral position through an angle of 14 to 20 degrees, (preferably through an angle of 16 to 18 degrees) in the direction of the arrow 83, and through an angle of 10 to 20 degrees (preferably 12 to 16 degrees) in the direction of the arrow 84.

Starting from the neutral position and within the angle of effectiveness of the damper 13, the damper 25 (which can be said to constitute a portion of the damper 13) is effective through the angle B in the direction of the arrow 83 and through the angle L in the direction of the arrow 84. The slope of the curve denoting the rate at which the resistance of the damper 25 to angular movements of the flywheels 3, 4 relative to each other increases is less pronounced than the slope of the curve denoting the increase of resistance of the damper 13.

The damper 25 has a spring characteristic of 1 to 5 Nm/degree in the direction of the arrow 83 and a spring characteristic of 1 to 5 Nm/degree in the direction of the arrow 84.

The second stage (note the coil springs 50 of FIG. 1) of the damper 13 has a hysteresis 91 between 2 and 30 Nm in the direction of the arrow 83 and a hysteresis between 2 and 30 Nm in the direction of the arrow 84.

The maximum torque 92 which can be transmitted by the second damper 14 amounts to between 100 and 250% of nominal torque of the engine.

The second damper (which operates or can operate at least in part in series with the first damper 13) has a spring characteristic (resistance to rotation) between 30 and 150 Nm/degree, preferably between 60 and 120 Nm/degree in the direction of the arrow 83 and a spring characteristic between 30 and 150 Nm/degree (preferably between 60 and 120 Nm/degree) in the direction of the arrow 84.

A hysteresis 93 between 100 and 500 Nm, preferably between 130 and 350 Nm, is superimposed upon the damper 14 in the direction of the arrow 83 and a hysteresis of between 100 and 500 Nm, preferably between 130 and 350 Nm, is superimposed upon the damper 14 in the direction of the arrow 84.

The damper 14 is effective through an angle of 2 and 10 degrees (preferably between 3 and 8 degrees) in the direction of the arrow 83, and through an angle of 2 to 10 degrees (preferably between 3 and 8 degrees) in the direction of the arrow 84.

The friction generating device 27 has a friction hysteresis 94 between 10 and 200 Nm, preferably between 10 and 120 Nm, in the direction of the arrow 83 and a hysteresis between 10 and 200 Nm, preferably between 10 and 120 Nm, in the direction of the arrow 84.

The friction generating device 27 is ineffective within an angle (such as H) in the region of 2 and 10 degrees, preferably between 2 and 8 degrees.

Figure 6:
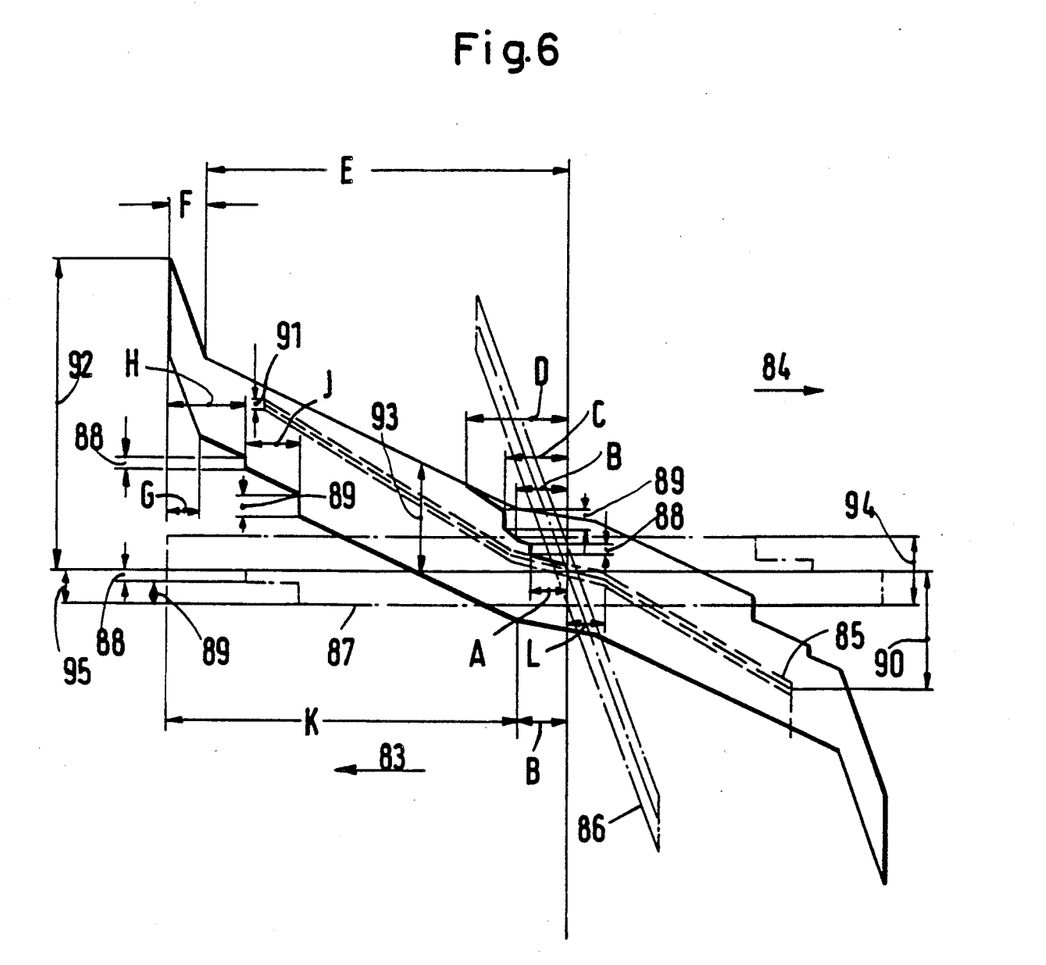
FIG. 6 is a torsion diagram of the apparatus which is shown in FIG. 1.

The friction generating device 27 operates in several stages (88, 89) after the flywheel 3 or 4 completes an angle of predetermined magnitude (see the angles H and J in FIG. 6).

The first stage or unit of the friction generating device 27 generates between ⅓ and ⅔ (shown at 88) of the overall moment 95 of friction which is generated by the friction generating device 27 in the direction of the arrow 83 and between ⅓ and ⅔ (shown at 89) of the overall moment of friction 95 of the friction generating device 27 in the direction of the arrow 84. The second stage or unit of the friction generating device 27 generates a moment of friction which amounts to between ⅔ and ⅓ of the overall moment 95 of friction in the direction of the arrow 83 and a moment of friction (89) amounting to between ⅔ and ⅓ of the overall moment 95 of friction of the friction generating device 27 in the direction of the arrow 84.

Torque which is transmitted by one or more selected dampers of the damper means 13, 14, 25-27 between the flywheels 3 and 4 can be altered in a number of ways. For example, the friction linings 41 of the damper 14 can be omitted or replaced by friction linings exhibiting different friction characteristics. Furthermore, the damper 14 can utilize a single friction lining 41. Still further, torque which is transmitted by the damper 14 can be altered by properly selecting the bias and the initial stressing of the diaphragm spring 40.

The extent to which the flange 38 and the flywheel 3 can turn relative to each other need not necessarily be determined by the rivets 36 and by the length of the corresponding openings or slots 38a. However the solution which is shown in FIG. 2 is desirable and advantageous because it contributes to simplicity and compactness of the apparatus.

The friction generating device 27 need not necessarily be mounted between the first damper 13 and the flange 39 of the flywheel 3. However the illustrated mounting of the friction generating device 27 is desirable and advantageous because it also contributes to compactness of the apparatus. The same applies for the mounting of the friction generating device 27 between the portion 51 of the flange 39 and the races 19a, 17 of the antifriction bearing 16. The ring 21a of the flywheel 3 constitutes a desirable but optional feature of the apparatus.

The friction generating device 26 (which opposes all angular movements of the flywheels 3 and 4 relative to each other) is preferably disposed radially outwardly of the friction generating device 27. This also contributes to compactness of the apparatus, especially since the flange 39 of the flywheel 3 can be said to constitute a component part of the friction generating device 26. As shown in FIG. 1, the distance between the common axis of the flywheels 3, 4 and the friction generating device 26 is or can be the same as the distance between such axis and the damper 13.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for damping torsional vibrations in the power train between the engine and the transmission of a motor vehicle, comprising a composite flywheel including a first flywheel connectable to the engine and a second flywheel arranged to transmit torque to the transmission, said first and second flywheels being coaxial with and being rotatable relative to each other clockwise and counterclockwise; and torque-transmitting damper means operative to oppose angular movements of said first and second flywheels relative to each other from a neutral position, said damper means including a first damper having means for opposing at least one stage of said angular movements with an increasing force, a second damper operating in series with said first damper and having means for opposing at least one range of said angular movements with an increasing force when the magnitude of torque which one of said first and second flywheels transmits to the other of said first and second flywheels reaches a preselected value, and a third damper including a friction generating device which opposes said angular movements with the exception of a predetermined angle following each change of the direction of angular movement of said first and second flywheels relative to each other, said range following said stage in said clockwise and counterclockwise directions and the maximum torque which said first damper transmits being between 80 and 130% of nominal torque of the engine, said second damper having a spring characteristic between 30 and 150 Nm during clockwise and counterclockwise angular movements of said first and second flywheels relative to each other.

2. The apparatus of claim 1, wherein said first damper has a characteristic curve corresponding to between 10 and 35 Nm/degree during clockwise and counterclockwise angular movements of said first and second flywheels relative to each other.

3. The apparatus of claim 1, wherein said first damper has a hysteresis of less than 30 Nm.

4. The apparatus of claim 3, wherein said first damper has a hysteresis between 2 and 30 Nm during clockwise and counterclockwise angular movements of said first and second flywheels relative to each other.

5. The apparatus of claim 1, wherein said stage includes an angular movement between 14°–20° in one direction and an angular movement between 10°–20° in the opposite direction from said neutral position.

6. The apparatus of claim 1, wherein said damper means further comprises a further damper having means for opposing said angular movements from said neutral position within a second stage which overlaps the stage of operativeness of said first damper, said first damper having a characteristic curve which is steeper than that of said further damper.

7. The apparatus of claim 6, wherein the means for opposing angular movements during said second stage includes at least one resilient element with a spring characteristic 1–5 Nm/degree in clockwise and counterclockwise directions.

8. The apparatus of claim 6, wherein the means for opposing said angular movements during said second stage has a hysteresis between 2 and 30 Nm in clockwise and counterclockwise directions.

9. The apparatus of claim 1, wherein the maximum torque which said second damper can transmit is between 100 and 250% of nominal torque of the engine.

10. The apparatus of claim 1, wherein said second damper has a hysteresis of between 100 and 500 Nm during clockwise and counterclockwise angular movements of said first and second flywheels relative to each other.

11. The apparatus of claim 1, wherein said range is between 2 and 10 degrees during angular movements of said first and second flywheels relative to each other in a clockwise or in a counterclockwise direction.

12. The apparatus of claim 1, wherein the characteristic curve of said friction generating device has a pronounced step of between 10 and 200 Nm following each reversal of clockwise and counterclockwise angular movements of said first and second flywheels relative to each other.

13. The apparatus of claim 12, wherein said predetermined angle is between 2 and 10 degrees.

14. The apparatus of claim 1, wherein said friction generating device comprises means for opposing different portions of said angular movements with different forces.

15. The apparatus of claim 1, wherein said friction generating device is arranged to generate a predetermined overall friction torque and includes a first unit having means for generating between ⅓ and ⅔ of said overall torque while said first and second flywheels perform first angular movements relative to each other in one direction and between ⅓ and ⅔ of said overall torque while said first and second flywheels perform said first angular movements relative to each other in the opposite direction, and a second unit having means for generating between ⅔ and ⅓ of said overall torque while said first and second flywheels perform second angular movements relative to each other in said one direction and between ⅔ and ⅓ of said overall torque while said first and second flywheels perform said second angular movements relative to each other in said other direction.

16. The apparatus of claim 15, wherein said first unit is operative during the initial portions of said angular movements following reversal in the direction of said angular movements, said second unit being operative during the next-following portions of said angular movements following a reversal in the direction of said angular movements.

17. The apparatus of claim 16, wherein each first portion of said angular movements is between 1 and 5 degrees, only said first unit being operative during the first portion of each of said angular movements.

18. The apparatus of claim 16, wherein said first and second units are operative jointly to oppose said angular movements following each reversal in the direction of said angular movements and after said first and second flywheels complete an angular movement through said predetermined angle and thereafter through one of said initial portions.

19. The apparatus of claim 1, wherein said damper means further comprises a fourth damper having a friction generating device with means for opposing all angular movements of said first and second flywheels relative to each other.

20. The apparatus of claim 19, wherein the moment of friction of said fourth damper has a hysteresis between 8 and 30 Nm.

21. The apparatus of claim 1, wherein said first and second dampers comprise pairs of discs, said first damper having means for securing the respective discs to one of said flywheels and said second damper having means for securing the respective discs to the other of said flywheels, said first and second dampers further having a common flange including a first portion between the discs of said first damper and a second portion between the discs of said second damper.

22. The apparatus of claim 21, wherein the discs of one of said pairs are disposed radially outwardly of the discs of the other of said pairs.

23. The apparatus of claim 21, wherein said flange overlaps the discs of said first and second pairs in the radial direction of said flywheels.

24. The apparatus of claim 21, wherein the discs of said second damper are arranged to rotate with said first flywheel and constitute the input element of said second damper, the respective portion of said flange constituting the output element of said second damper and the other portion of said flange constituting the input element of said first damper, the discs of said first damper constituting the output element of said first damper.

25. The apparatus of claim 21, wherein the discs of said first damper are connected with said second flywheel.

26. The apparatus of claim 21, further comprising means for biasing the discs of said second damper against the respective portion of said flange.

27. The apparatus of claim 21, wherein said second damper further comprises a friction lining between the second portion of said flange and at least one disc of the second damper.

28. The apparatus of claim 21, wherein one disc of said second damper is movable axially of said flywheels toward and away from the other disc of said second damper.

29. The apparatus of claim 28, wherein the means for securing the discs of said second damper to the respective flywheel comprises at least one rivet.

30. The apparatus of claim 28, wherein said second damper further comprises means for biasing said one disc of said second damper axially of said flywheels toward the other disc of said second damper.

31. The apparatus of claim 30, wherein said biasing means comprises at least one spring which reacts against said other flywheel and bears against the one disc of said second damper.

32. The apparatus of claim 31, wherein said spring is a diaphragm spring.

33. The apparatus of claim 28, wherein the means for securing the discs of said second damper to said other flywheel comprises at least one rivet arranged to hold said one disc of said second damper against rotation relative to the other flywheel.

34. The apparatus of claim 33, wherein the second portion of said flange has an opening which receives said rivet with limited freedom of angular movement of said flange relative to said other flywheel.

35. The apparatus of claim 1, wherein at least one of said flywheels has an axial extension which is disposed radially outwardly of said damper means.

36. The apparatus of claim 35, wherein said extension surrounds said second damper.

37. The apparatus of claim 1, wherein said second damper comprises an input element having two coaxial discs, an output element between said discs, means for securing said discs to said first flywheel so that one of said discs is movable axially toward and away from the other of said discs, and means for biasing said one disc toward the other disc so that said output element is in frictional engagement with said discs, said biasing means comprising a diaphragm spring which reacts against said first flywheel and bears against said one disc.

38. The apparatus of claim 1, wherein said friction generating device comprises at least one friction generating element arranged to rotate with said first flywheel and means for limiting the extent of angular movability of said friction generating element relative to said second flywheel.

39. The apparatus of claim 38, wherein said friction generating device is disposed between said first and second flywheels.

40. The apparatus of claim 1, wherein said friction generating device is mounted on said first flywheel.

41. The apparatus of claim 1, wherein one of said first and second flywheels has an axial protuberance and said friction generating device surrounds said protuberance.

42. The apparatus of claim 1, further comprising bearing means interposed between said first and second flywheels, one of said flywheels having a radial flange adjacent said bearing means and at least a portion of said friction generating device being disposed between said flange and said bearing means.

43. The apparatus of claim 1, wherein one of said first and second flywheels has a radial flange and said friction generating device comprises at least one friction disc and means for biasing said disc axially of said flywheels toward said flange.

44. The apparatus of claim 43, further comprising bearing means interposed between said first and second flywheels and having inner and outer races and at least one set of rolling elements between said races, said biasing means comprising a diaphragm spring which reacts against one of said races.

45. The apparatus of claim 44, wherein one flywheel has a ring and said diaphragm spring reacts against said ring.

46. The apparatus of claim 1, wherein said friction generating device comprises a friction disc arranged to rotate with one of said flywheels and having at least one projection extending in the direction of the common axis of said first and second flywheels, the other of said flywheels having a portion provided with a recess receiving said projection with predetermined freedom of angular movement of said friction disc and said other flywheel relative to each other.

47. The apparatus of claim 1, wherein said friction generating device comprises two concentric friction discs and means for biasing one of said discs toward the other of said discs.

48. The apparatus of claim 47, wherein said friction generating device further comprises means for holding said discs to limited angular movement relative to each other.

49. The apparatus of claim 48, wherein said holding means comprises at least one first projection provided on one of said discs and two second projections provided on the other of said discs and flanking said first projection with a predetermined freedom of movement of said first projection between said second projections.

50. The apparatus of claim 49, wherein said first projection extends substantially radially of said flywheels and said second projections extend substantially axially of said flywheels.

51. The apparatus of claim 49, wherein said one disc is in frictional engagement with one of said first and second flywheels and further comprises a lug cooperating with the other of said first and second flywheels to permit limited angular movements of one disc and said other flywheel relative to each other.

52. The apparatus of claim 51, wherein said lug is disposed between said second projections as seen in the circumferential direction of said flywheels.

53. The apparatus of claim 47, wherein said friction generating device further comprises a friction ring between said discs.

54. The apparatus of claim 47, wherein one of said first and second flywheels has a substantially radially extending portion and said other disc is adjacent said radially extending portion of said one flywheel, said friction generating device further comprising a friction ring between said portion of said one flywheel and said other disc.

55. The apparatus of claim 47, wherein one of said first and second flywheels has a radially extending portion adjacent said other disc, said friction generating device further comprising means for limiting said discs to a first angular displacement relative to each other and means for limiting said one disc and the other of said first and second flywheels to a different second angular displacement relative to each other.

56. The apparatus of claim 55, wherein said second angular displacement is smaller than said first angular displacement.

57. The apparatus of claim 1, wherein said friction generating device comprises a friction disc including a diaphragm spring which is maintained in axially stressed condition.

58. The apparatus of claim 57, wherein said friction generating device further comprises a second friction disc, said diaphragm spring having a radially outer portion bearing directly against said second friction disc and a radially inner portion anchored in said first flywheel.

59. The apparatus of claim 58, wherein said first flywheel has an axial protuberance and a ring surrounding said protuberance, said inner portion of said diaphragm spring being anchored in said ring.

60. The apparatus of claim 59, wherein said inner portion of said diaphragm spring and said ring have means for holding said diaphragm spring against rotation relative to said ring.

61. The apparatus of claim 59, wherein said ring has at least one opening and said inner portion of said diaphragm spring has an arm in said opening.

62. The apparatus of claim 1, wherein said damper means further comprises a fourth damper including a friction generating device arranged to oppose all of said angular movements and being disposed outwardly of said third damper as seen in the radial direction of said flywheels.

63. The apparatus of claim 1, wherein said damper means further comprises a fourth damper having a friction generating device which surrounds the friction generating device of said third damper.

64. The apparatus of claim 1, wherein said damper means further comprises a fourth damper including a friction generating device arranged to oppose all of said angular movements, said first and fourth dampers being disposed at or close to the same distance from the common axis of said first and second flywheels.

65. The apparatus of claim 1, wherein said first flywheel has a substantially radially extending portion and said damper means further comprises a fourth damper including a friction generating device which is arranged to oppose all angular movements of said first and second flywheels relative to each other, said fourth damper being disposed between said first damper and said portion of said first flywheel.

66. The apparatus of claim 1, wherein said first flywheel has a radially extending portion and said first damper comprises a flange-like input element and an output element including two discs flanking said input element and non-rotatably connected with said second flywheel, said damper means further comprising a fourth damper including a friction generating device disposed between one of said discs and said portion of said first flywheel.

67. The apparatus of claim 66, wherein said fourth damper comprises a friction disc and a friction ring between said friction disc and said portion of said first flywheel.

68. The apparatus of claim 67, wherein said fourth damper further comprises a diaphragm spring which reacts against said one disc of said output element and bears against said friction disc.

69. The apparatus of claim 68, wherein said diaphragm spring comprises at least one projection which is anchored in said one disc of said output element.

70. The apparatus of claim 68, wherein said friction disc has at least one projection which is anchored in said one disc of said output element.

71. The apparatus of claim 70, wherein said diaphragm spring has two projections flanking the projection of said friction disc as seen in the circumferential direction of said flywheels.

* * * * *